United States Patent
Payne et al.

(10) Patent No.: US 10,296,016 B1
(45) Date of Patent: May 21, 2019

(54) SELF-LIMITING PUMP-MOTOR-VFD COMBINATION

(71) Applicants: Bryan Payne, Cornelius, NC (US);
Eugene Fina, Barrington, RI (US);
Steven K. Sullivan, Cranston, RI (US);
Keith M. Desrosiers, Foster, RI (US)

(72) Inventors: Bryan Payne, Cornelius, NC (US);
Eugene Fina, Barrington, RI (US);
Steven K. Sullivan, Cranston, RI (US);
Keith M. Desrosiers, Foster, RI (US)

(73) Assignee: Taco, Inc., Cranston, RI (US)

( * ) Notice: Subject to any disclaimer, the term of this patent is extended or adjusted under 35 U.S.C. 154(b) by 622 days.

(21) Appl. No.: 14/328,606

(22) Filed: Jul. 10, 2014

Related U.S. Application Data

(60) Provisional application No. 61/844,655, filed on Jul. 10, 2013.

(51) Int. Cl.
| | |
|---|---|
| *G05D 7/00* | (2006.01) |
| *G05D 11/00* | (2006.01) |
| *G05D 7/06* | (2006.01) |
| *F04D 15/00* | (2006.01) |
| *G05B 13/04* | (2006.01) |

(52) U.S. Cl.
CPC ....... *G05D 7/0617* (2013.01); *F04D 15/0066* (2013.01); *G05B 13/041* (2013.01)

(58) Field of Classification Search
None
See application file for complete search history.

(56) References Cited

U.S. PATENT DOCUMENTS

| | | | |
|---|---|---|---|
| 4,522,333 A | 6/1985 | Blau et al. | |
| 6,354,805 B1 | 3/2002 | Moller | |
| 6,715,996 B2 | 4/2004 | Moeller | |
| 8,436,559 B2 | 5/2013 | Kidd et al. | |
| 8,564,233 B2 | 10/2013 | Kidd et al. | |
| 2007/0212229 A1* | 9/2007 | Stavale | F04D 15/0088 417/42 |
| 2008/0288115 A1* | 11/2008 | Rusnak | F04D 15/0066 700/282 |
| 2009/0236432 A1* | 9/2009 | Malloy | F24F 3/044 236/49.3 |
| 2014/0368152 A1* | 12/2014 | Pasche | F04B 49/02 318/805 |
| 2015/0037169 A1* | 2/2015 | Veltman | F04D 15/0088 417/44.1 |
| 2016/0003242 A1* | 1/2016 | van der Merwe | F04C 14/08 700/282 |

* cited by examiner

*Primary Examiner* — Ziaul Karim
*Assistant Examiner* — Md Azad
(74) *Attorney, Agent, or Firm* — Barry G. Magidoff; Paul J. Sutton

(57) ABSTRACT

This invention provides, in various embodiments, a variable frequency drive system for controlling a pump driven by a variable frequency electric motor, with the pump in fluid communication with a fluid system. The drive system of this invention improves the efficiency of the prior variable frequency drive systems by inserting into the memory of the variable frequency drive the maximum flow required for the particular flow system in which the pump is operating and adding an initial pump starting module that limits the initial starting flow rate from the pump to the desired maximum flow rate for the system, which is separately calculated.

8 Claims, 13 Drawing Sheets

SELF-LIMITING PUMP-MOTOR-VFD COMBINATION

This application claims the benefit of priority pursuant to 35 U.S.C. 119(e) from a U.S. Provisional Patent Application No. 61/844,655 filed on Jul. 10, 2013, the text of which is fully incorporated by reference herein as if repeated below.

The present invention provides a basis for operating a pump in a manner so as to achieve the necessary flow rate through a given system, utilizing the most effective power input and pump operating characteristics, by combining additional control systems to a prior art system.

BACKGROUND

Variable frequency drives (VFD's) for electric motor-driven centrifugal pumps are commercially available today. They are effective in providing a significant improvement over the efficiency of previously available constant speed electric motor-driven centrifugal pumps. These pump motor drives provide an effective "flow compensation" feature that results in energy savings by varying the electric current frequency rate powering the motor, to directly modify the output of the pump driven by the motor, as demand may change. Further improvements in efficiency are always welcome, and the present invention results in further improvement in the energy usage by the electric motor driving the pump, in real situations. The present invention is especially effective for electric motor-driven, centrifugal pumps subject to widely varying demand. In the past, such systems generally required a complicated initial set-up in order to carry out its control of the system in the most efficient manner. The most advanced such systems did not require external sensors in order to properly control the pump system, relying instead on internal data bases.

It is a well-known general rule of engineering to specify equipment providing a substantial margin of safety, such as specifying pumps and the motors driving them that are 50% to 100% larger than is necessary for the particular context, so as to avoid problems in any unexpected situation, or as the pump and motor age. However, the effect of that built in margin of error on the efficiency of the system, in regards to energy usage, was not fully appreciated in the context of the variable frequency drive systems, or at least they did not include means to compensate for such margin. Previously, in order to reduce the maximum flow, it was necessary to change the system, by introducing a valve at the outlet from the pump, calibrated by extensive and costly testing, in addition to the internal data base of the VFD. The prior system also included an algorithm to maintain the pump at a constant flow output, regardless of the change in pump head resistance.

Examples of the operation of a VFD are widely available, for example from the Danish company Danfoss Low Power Drives, in U.S. Pat. Nos. 8,564,233 and 8,436,559, as well as U.S. Pat. Nos. 6,715,996 and 6,354,805, describing systems without external sensors. Systems commercially available include the Danfoss VLT HVAC Drive.

Such controller systems include software executed by a digital signal processor (DSP) or a microprocessor, and can perform real-time control by using the input electric current and the power of the electric motor as control variable, to the effect that the desired operating point of the motor, and hence of the pump, remains stable. The current frequency and the electrical power input are compared with an empirically prepared, stored table of associated input power and electrical frequency, compared to liquid flow and pressure head. As a further enhancement, to compensate for any effect the heating of the motor may have on power output, the data can also include any power changes of the motor from the operating temperature of the motor.

SUMMARY OF THE INVENTION

It is thus an object of this invention to further improve the efficiency of a motor-driven centrifugal pump controlled by a computer-operated variable frequency drive ("VFD"). In accordance with this invention, there is an improvement to the computer operating software for previously commercially available VFD systems that operate without external sensors such as flow rate sensors or pressure sensors. The previously available VFD computer systems contain a software algorithm that automatically reprograms the speed of a pump motor so as to meet varying demand from the flow system in which the pump is operating, utilizing a variable frequency drive that is preprogrammed to vary the speed of the pump along a quadratic system curve, e.g., a so-called flow compensation mode, for example as provided by the Danfoss Drive A/S Company of Denmark. This prior system also includes a "flow balancing mode" algorithm, or a Sensorless Constant Flow mode, which seeks to maintain a constant flow rate, based solely on measuring the intrinsic characteristics of the motor, i.e., current frequency and electrical power input. In accordance with the present invention, there is programmed into the "flow balancing mode" algorithm a maximum calculated flow limitation (based upon the flow system in which the pump is to be placed), and an added switch, or programmable parameter, for automatically changing from the "flow balancing mode" to the "flow compensation mode" algorithm, when a steady state flow at the calculated maximum is achieved. The flow compensation mode algorithm then automatically allows for changing of the flow rate as demand may change during ongoing operation of the flow system, by following the quadratic control curve of the pump, to meet demand. The quadratic control curve of the pump is included as part of the VFD.

The prior VFD system controls the pump, through a proportional-integral-derivative method ("P-I-D controller") included as part of the VFD, by varying the frequency of the alternating current powering the pump motor in accordance with the flow compensation mode algorithm, that varies the pump speed to generate a designated flow rate and pressure head, which is determined by the VFD, based upon current frequency supplied to the pump motor, or by the flow balancing mode algorithm, which maintains a constant flow rate as preset by the user. The algorithm determines the pressure head and flow rate based upon the current frequency, which determines the pump impeller speed; as flow rate changes, the pressure head necessarily changes causing the pump motor to draw more or less power, directly reflecting the change in pressure head as the flow changes. The current frequency determines flow rate provided by the pump, which in turn determines the resulting pressure head generated in the system. The supplied power provided to the pump, varies generally along a quadratically varying curve, i.e., the so-called system resistance curve, and automatically changes as the power required by the motor to drive the pump varies, as the generated pressure head varies, i.e., with the square of the flow rate.

The prior VFD included a microprocessor, or a digital signal processor, which had a digitized electrically erasable programmable read-only memory, or EEPROM, but any other type of programmable memory system could be used. The memory contained a data base including an empirically determined table of associated input power and electrical frequency compared with liquid flow and pressure head, that correlates the motor current frequency, in Hertz ("Hz"); the electric power input; and the pump impeller speed (rpm), with pressure head and flow rate (gpm). However, the prior VFD failed to include a startup function to efficiently begin operation of the system within an actual flow system. The empirical database was derived by operating the pump-motor combination in a laboratory setting that did not include a static head. The prior VFD included a system readout, on a provided display, showing the thus calculated flow rate from those electrical power and current frequency values, for the specific pump-motor combination to which it is attached. However, there was no feedback from the display to the p-i-d to tell the VFD when the calculated flow rate maximum had been achieved.

If a particular flow system into which the pump-motor-VFD system was connected required the overcoming of a static head, the VFD is preset for such a static head, which effectively moved the quadratic resistance curve upwardly along the y-axis of FIGS. 3 and 4, by the amount of the static head, as shown in FIG. 3.

Surprisingly, the efficiency of motor pumps operated in accordance with the prior VFD systems can achieve greatly improved efficiency of operation if the VFD database in the system is modified to include the computed "design" flow, i.e., the maximum flow, needed to meet the anticipated maximum demand for the particular fluid flow system into which the pump is installed. It has been found that this prevents the pump system from overshooting the true maximum flow and thus operating at a greater power range than is necessary to meet the actual demand.

In one embodiment, the VFD is programmed to provide a feedback connection between the flow rate readout and the proportional-integral-derivative controller ("P-I-D controller") in the VFD, to cause the VFD to set the initial flow rate at the most efficient combination of current frequency (Hz) and power input to meet the calculated true maximum flow required. This results in the lowest combination of flow and pump head at the maximum demand point, for the particular flow system into which the particular electric motor/centrifugal pump/VFD combination is incorporated; the result is a substantial improvement in the efficiency of the operation of the pump over the range of demands from the lowest to the computed maximum demand point.

The incorporated system includes the algorithm to calculate pump flow rate output based upon the electric frequency and electric power supplied to the motor driving the pump, based upon an empirically entered database of data points correlating current frequency and power input to the pump motor, with measurements of pressure head, and flow as determined in a laboratory setting for the pump-motor combination. In addition, the flow rate to meet the maximum demand for the flow system into which the pump-motor is to be ultimately installed is computed and also entered into the VFD, in the present invention, to limit the maximum speed of the pump to the computed value.

The prior VFD's did not include a feedback from the output calculations to further control the VFD based upon a limitation setting the maximum design flow rate from the pump for the particular flow system. By including this empirically calculated maximum demand value into the prior VFD data base, which database is inherent to the particular pump-motor-VFD combination, regardless of the overall flow system into which it is incorporated, and inserting the computed maximum required flow rate and preferably maximum head pressure, for the overall flow system, into the VFD data base, the pump can be automatically set up and operated in the context of the overall system, without the need for balancing processes and equipment, to achieve improved efficiency. By inserting the flow system maximum demand point into the data base, together with the additional small programs of this invention, the pump can deliver design system maximum demand flow at a slower speed and reduced head, which allows for a greater efficiency in the operation of the pump.

The system of this invention, in one embodiment, provides a feedback to the p-i-d to tell the VFD when the flow rate maximum had been achieved, so that the VFD will not permit the pump to exceed that calculated maximum flow. The maximum flow rate can be entered into the VFD by setting the appropriate numerical parameter within the display to that value and operating the system with the Sensorless Constant Flow mode program until the system is substantially stabilized at that value. It must be understood that being "substantially stabilized" in a system such as this does not mean that the flow remains absolutely constant, but that the flow is held within the upper and lower boundaries of the user defined P-I-D limits (by way of example only, +5% or 10%, of the desired value), it is considered stabilized.

The proportional-integral-derivative controller ("P-I-D controller"), within the VFD, automatically computes the new demand, as it is reduced below the maximum, based upon the change in power input required, to the new lower value, as demand in the flow system is reduced.

The following drawings disclose preferred embodiments of the present invention and may include all or most of the preferred features. The process for modifying the VFD Software and database are also described, and, again, the invention comprises the combination of steps to form the desired, more efficient, self-balancing system.

These details of one or more embodiments of the invention are set forth in the accompanying drawings and descriptions below. Other features and advantages of the invention will become apparent from the description and the drawings within the scope of the invention as defined in the claims. The figures, which are not necessarily to scale, depict selected embodiments and are not intended to limit the scope of the invention.

GENERAL DESCRIPTION OF DRAWINGS

FIGS. 5B and 5B-2 depict flow charts, or decision trees, for the Automated Pump Balancing Algorithm, with FIG. 5B-2 depicting the operation at a lower-level;

Figure 2:
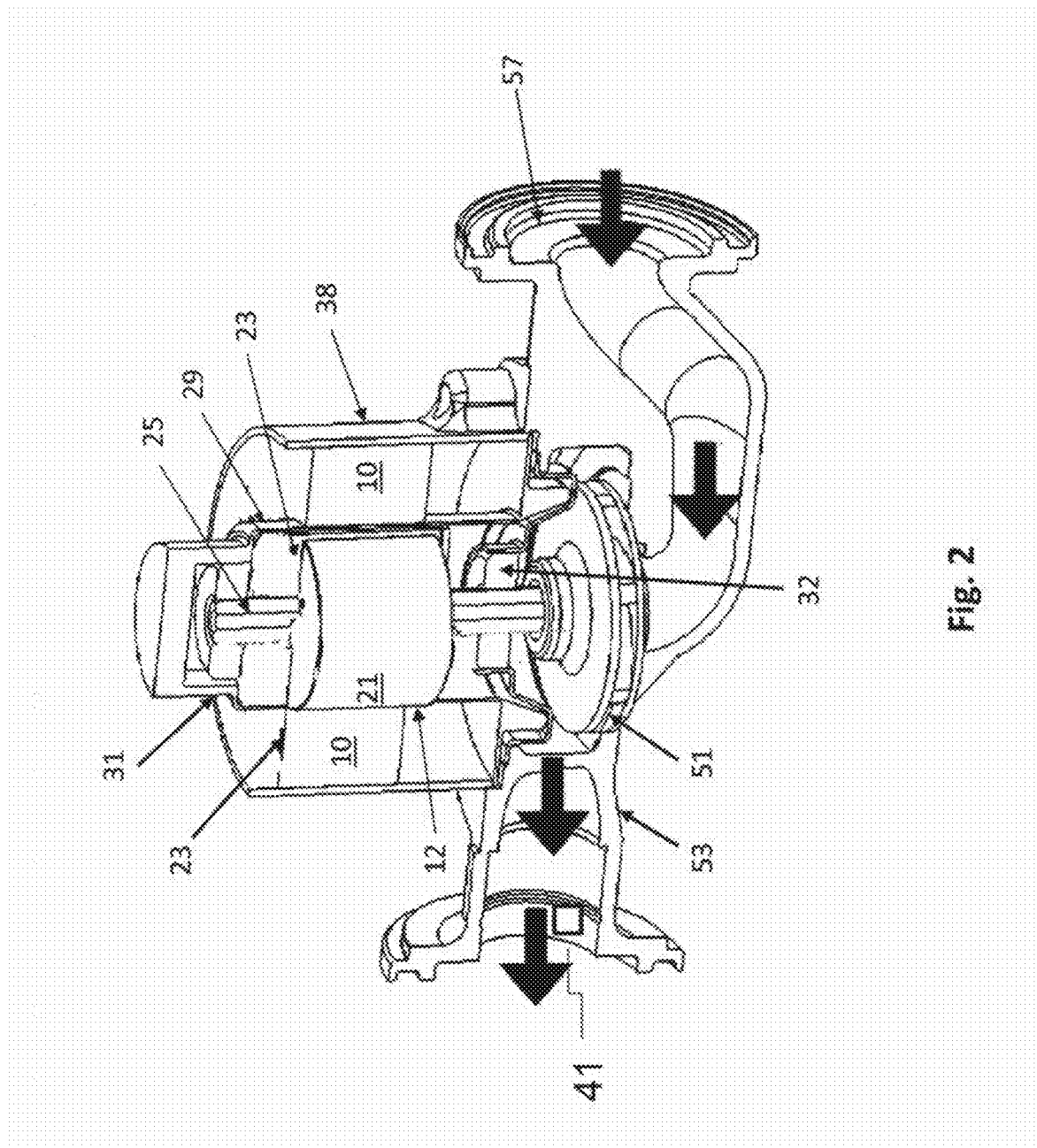
FIG. 2 is a cut-away perspective view showing the preferred example of a combined variable frequency current electric motor and centrifugal impeller pump, as one embodiment useful with the present invention.
Figure 5A:
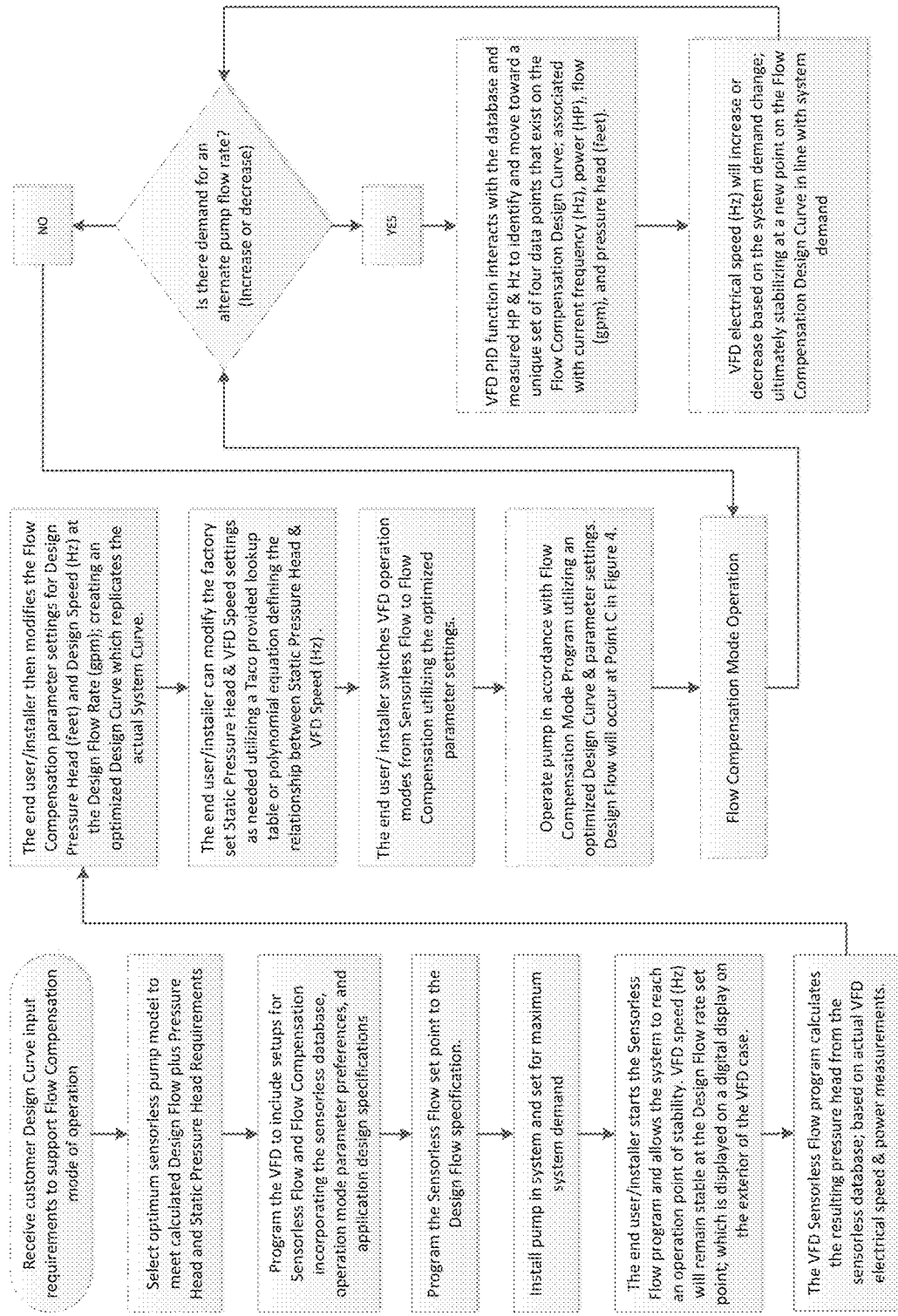
FIG. 5A depicts a flow chart, or decision tree, for software to be used in the present invention to set the initial current frequency and pressure head, based upon the computed maximum required flow in the system in which the pump operates (the "Design Flow") combined with the previously available VFD/P-I-D software, to which they are operatively joined, in a semi-automatic mode.
Figure 5B:
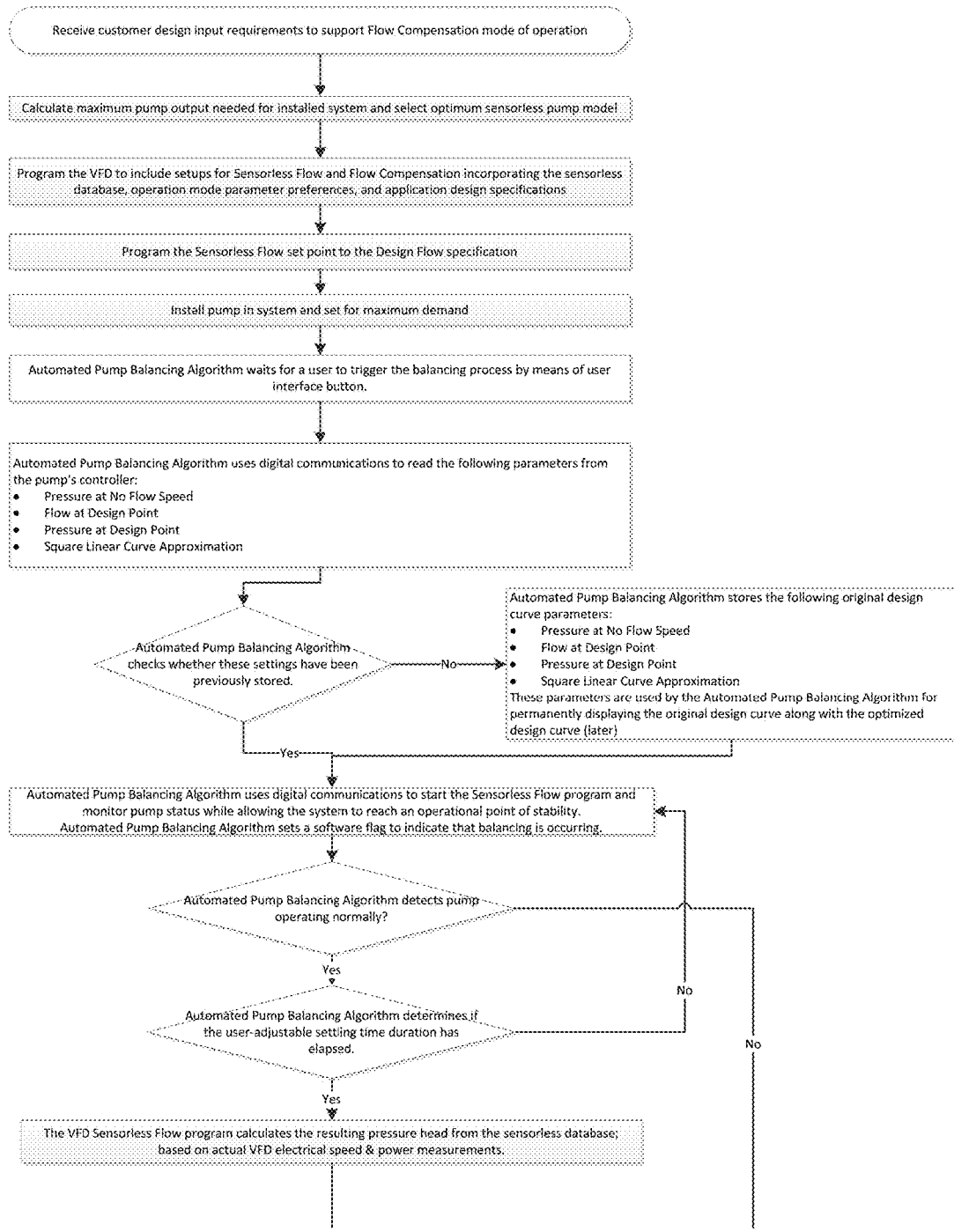
Figure 5B:
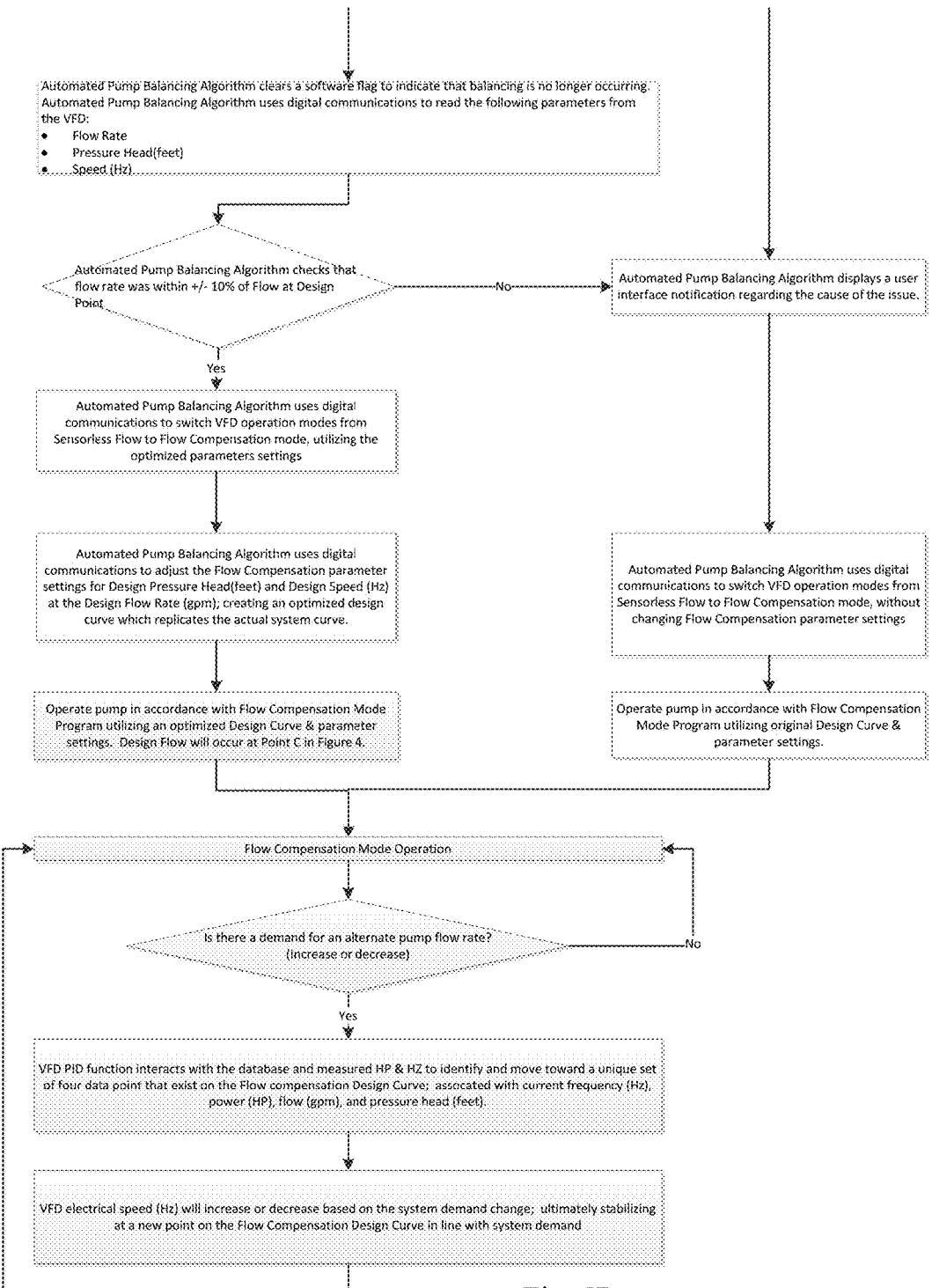
Figures 2, 5B:
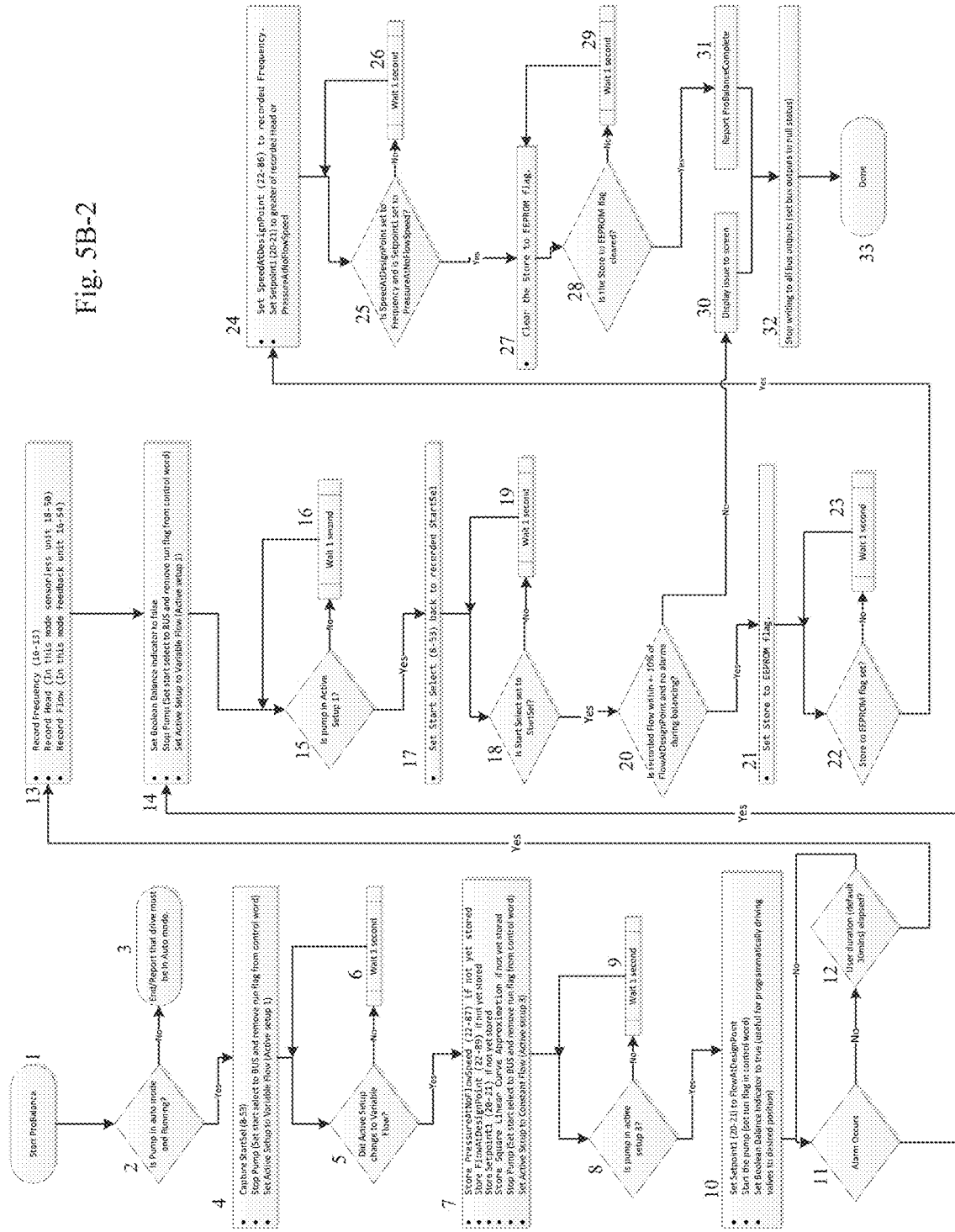
Figure 7:
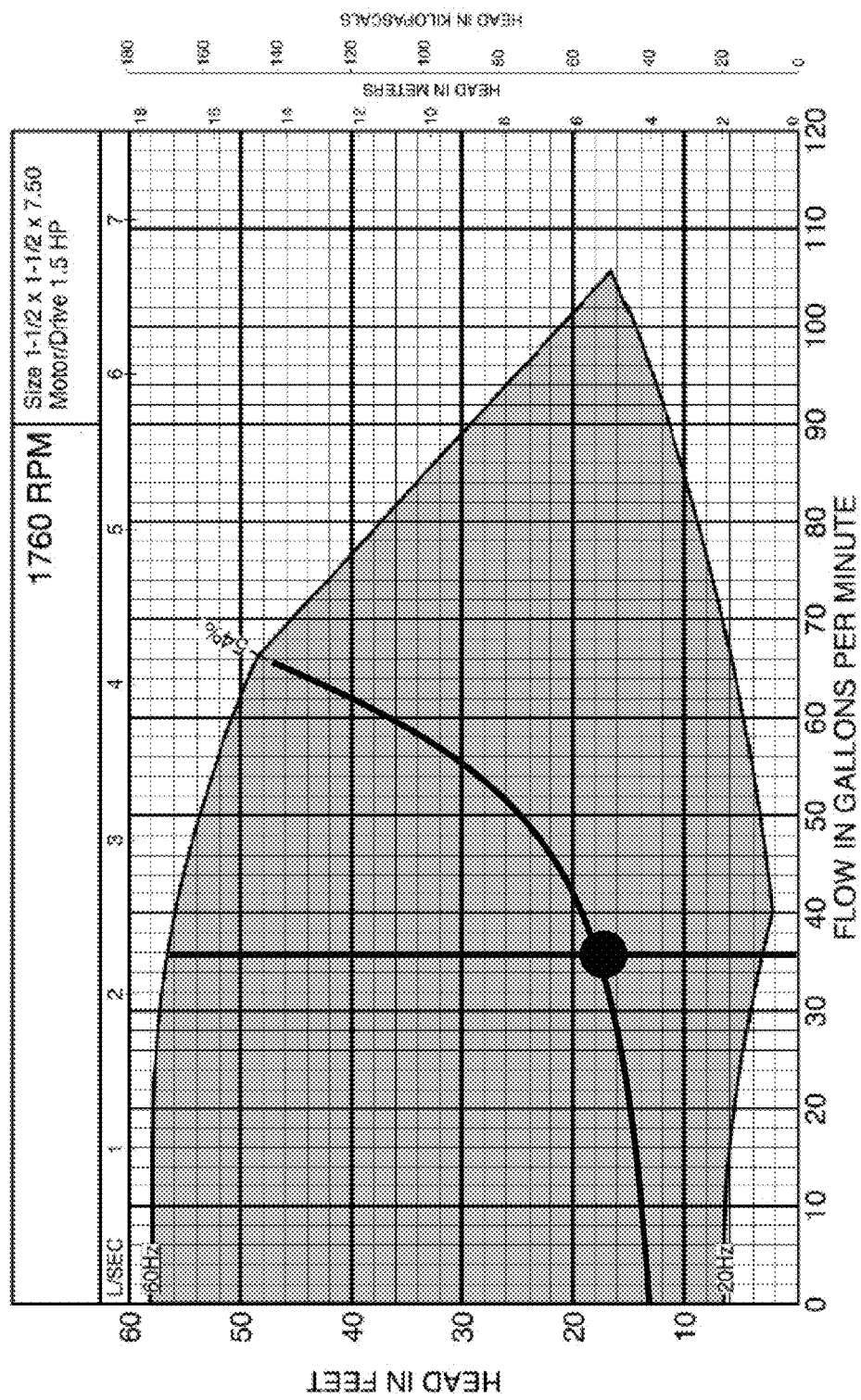
Figure 8A:
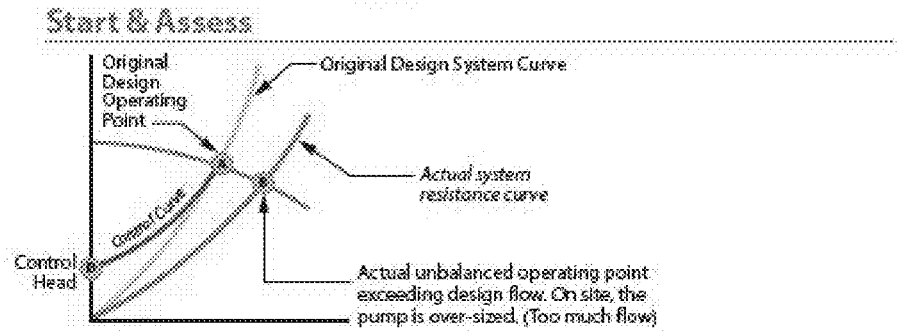
Figure 8B:
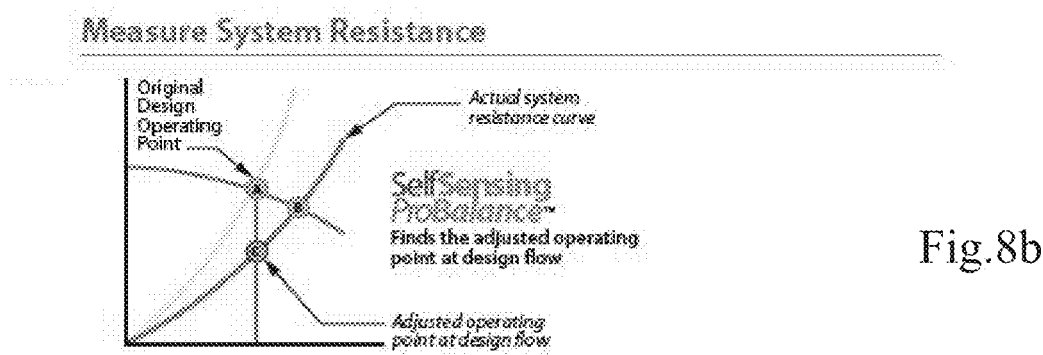
Figure 8C:
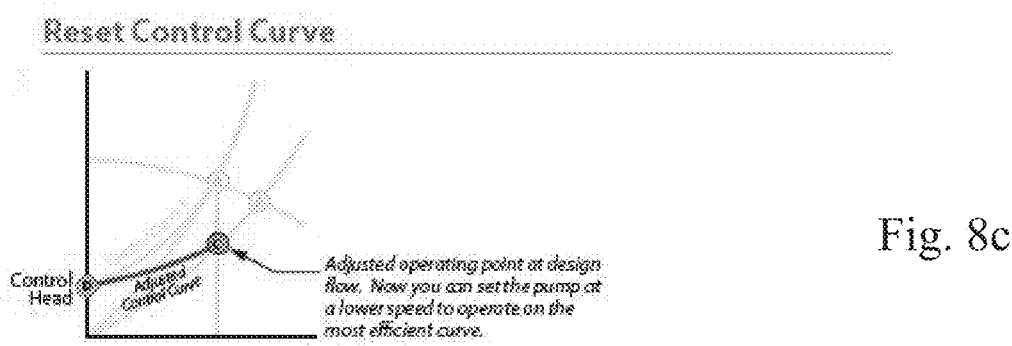

FIG. 7 is a depiction of a user accessible interface display showing a graphical display of a quadratic control curve for a SelfSensing variable speed pump or for a constant speed pump, showing the potential area of pump operation for a given system; and FIGS. 8A, B and C depict an example of the series of changes to a user control system through the graphical display, available as a result of the present invention, by following the flow charts of FIGS. 5B and 5B-2.

DETAILED DESCRIPTION OF THE DRAWINGS AND CERTAIN EMBODIMENTS OF THE INVENTION

Referring to the drawings, they reflect certain preferred embodiments of the invention defined herein. The variable frequency current motor is effective with a centrifugal impeller type of pump. In these embodiments, the radial gap electric motor, having a coaxially rotating rotor directly mechanically connected to the pump impeller is the embodiment shown in the drawings.

Figure 1:
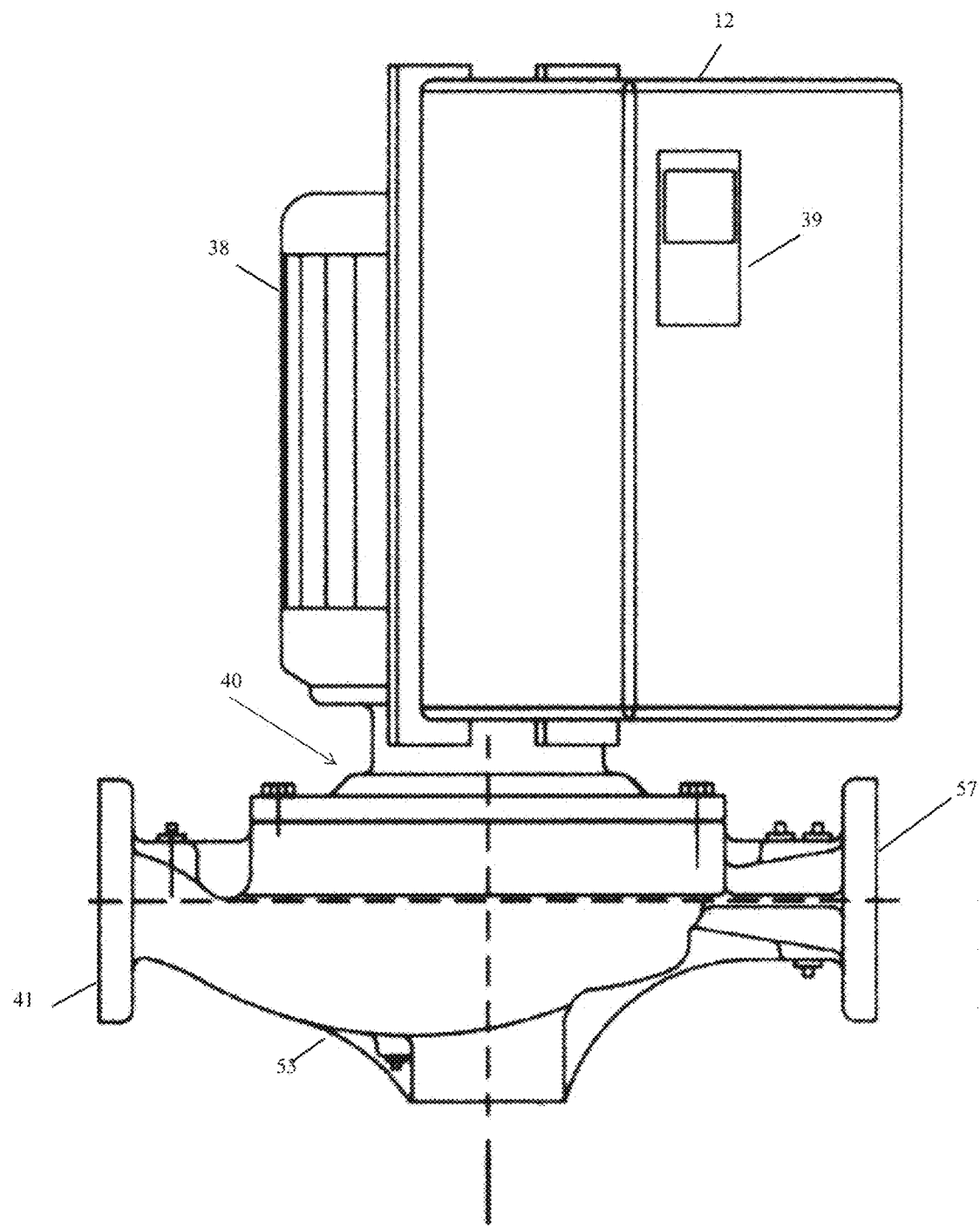
FIG. 1 is a perspective view showing a preferred example of a centrifugal impeller pump including a Variable Frequency Drive in accordance with the present invention, with a readout screen.
Figure 1A:
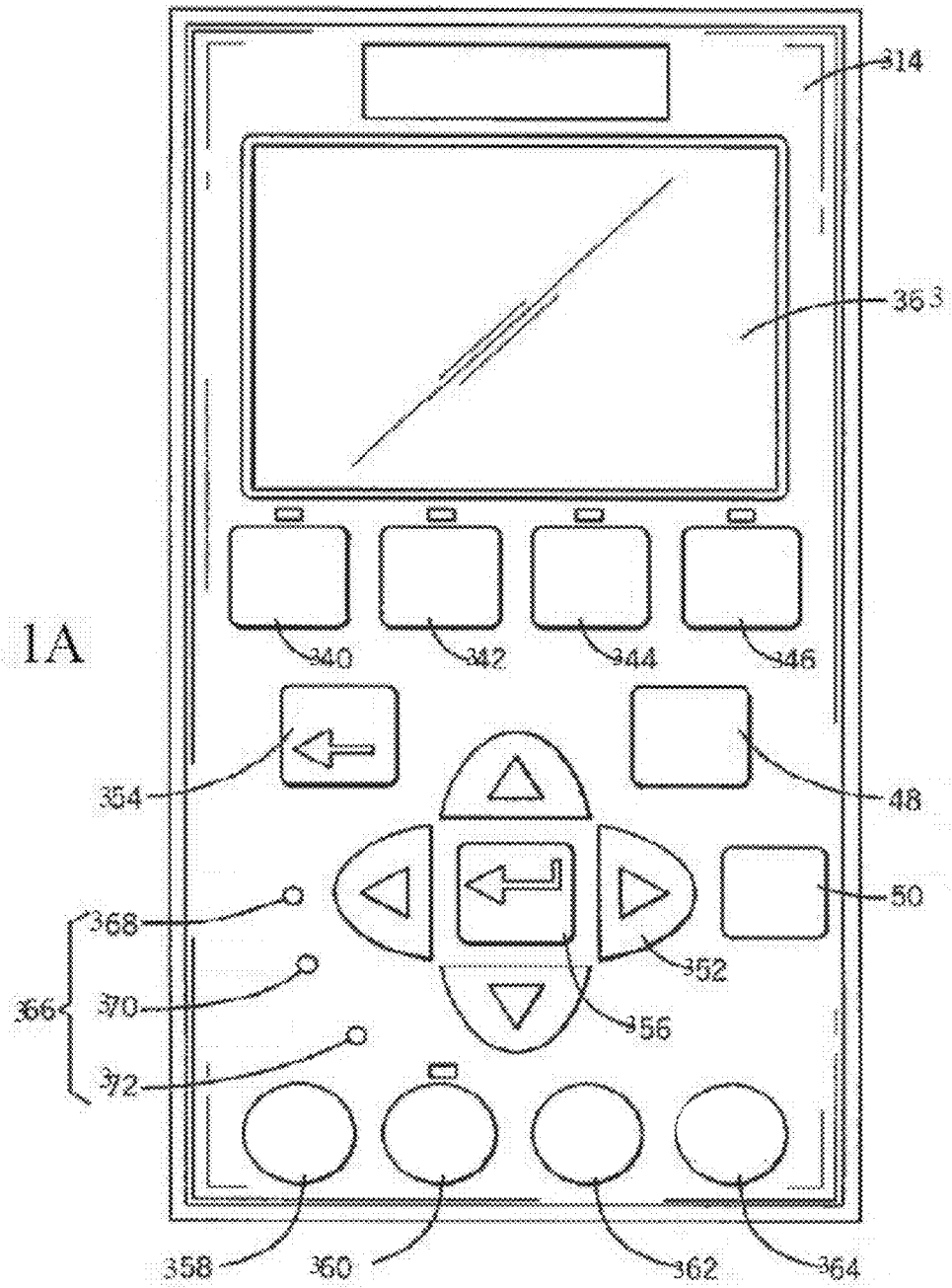
FIG. 1A is a more detailed front elevation view of one embodiment of the user operated screen 339 and input pad 39 shown on the outside of the pump of FIG. 1.

Referring to FIGS. 1, 1A and 2, the external view of the pump includes the outer casing of the VFD electronics system 12, showing the external user operated screen and pad 39 including the external user operated screen 339 and the several input buttons 340, 342, etc.; the rotary motor 38 and its connection to a centrifugal water pump, generally indicated by the numeral 40. This is a preferred embodiment for the VFD of the present invention. Within the case 12 are included the operative parts of the VFD, including an input power terminal block, an output power terminal block, a microprocessor having a digitized memory data base containing, inter alia, an empirically prepared, stored table of associated input power and electrical frequency, compared with liquid flow and pressure head values.

As diagrammatically shown in FIG. 2, the motor exemplified includes the stators 10, formed of permanent magnets; the stator coils 10 concentrically surround a rotor 21, formed of a central shaft 25 locked onto a soft iron core surrounded by electrical wire field windings (not shown in detail) and locked in place relative to the shaft 25. A motor, where the electromagnetic windings are in the stator and permanent magnets form the rotor, can also be used.

A non-ferromagnetic central shaft 25 is keyed to the soft iron magnetizable material of the rotor 21 and, when variably polarized electrical power is applied to the rotor field windings of the rotor 21 (or alternatively, the electrical power is applied to the field windings of the stator, the permanent magnet forming the rotor), the rotor is caused to rotate and, through the central shaft 25, drives the centrifugal impeller 51 of the pump, driving the liquid, generally an aqueous liquid, from the inlet 57 through and out the outlet 53.

Figure 3:
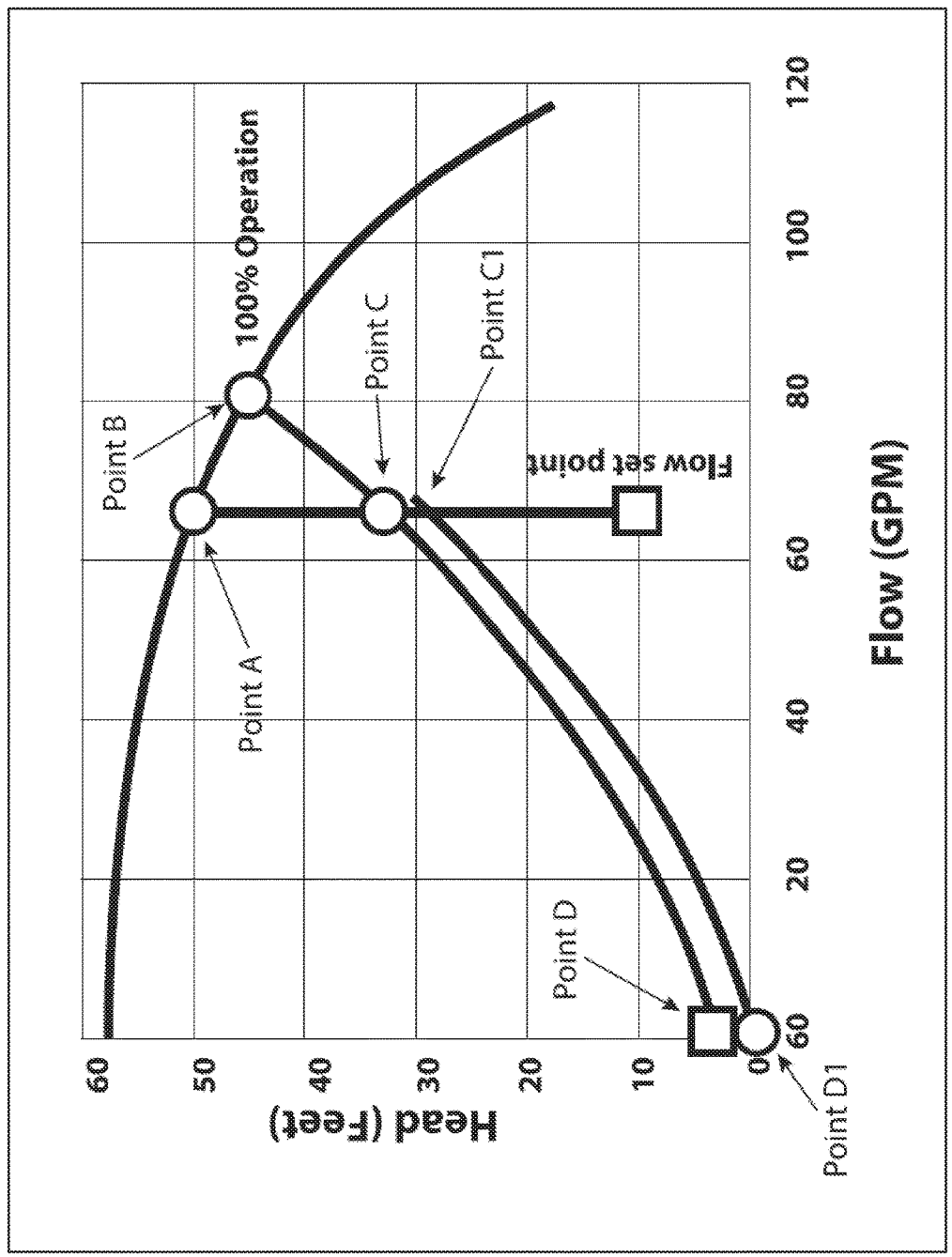
FIG. 3 depicts an example of a simplified and generalized Flow versus Pressure Head chart for the VFD-controlled pump of the present invention, operating in 60 Hz constant frequency, or speed, constant flow, and flow compensation modes.

FIG. 3 graphically depicts, in simplified form, the operation of the pump when controlled by the software combination of the VFD and the algorithms of the present invention, as determined by the full database entered into the VFD in accordance with this invention. Thus, in this example, because the pump is over-sized for the application, following the engineer's usual margin of error in sizing a component, the maximum output of the pump, at a current frequency of 60 Hz, is greater than the actual maximum demand of the system; the pump operates at point B (in this low volume example), putting out 80 gallons per minute ("gpm"), instead of the actual system demand maximum previously determined by computation to be 65 gpm at point "C."

In this empirical test, the pump is started up, at maximum power, using the current frequency obtainable from the electric main, i.e., 60 Hz. The pump VFD then resets itself to output the actual maximum overall system flow requirement of 65 gpm, reducing the maximum current frequency going forward, inherently taking into account any excess pump capacity so as to reduce power usage, and thus increase efficiency.

This is achieved by adding a feedback loop to the database correlation of current frequency, power input, flow rate and pressure head value, based upon the computed maximum flow rate and pressure head, to set the frequency maximum and calculated system pressure head, thus defining the quadratic curve along which the flow compensation mode routine will operate. This results in a greater energy efficiency than is the case when using the unaltered modulating subroutine previously included with the variable frequency drive.

In accordance with this invention, there is provided a computer-operated system wherein the computer contains a database comparing power input and electrical frequency with pump head generation to achieve a given flow rate. In order to obtain this database, each particular pump-motor combination containing a P-I-D pump control processor, which is capable of having additional data inputted to the VFD database, is operated under laboratory conditions to enter the relationships between electrical power input and current oscillation frequency (Hz), and head pressure, and flow rate, by measuring the pressure and flow over a wide range of power input and current frequency.

Once the empirical data is entered into the processor database of the pump control system, the pump and motor and its VFD controller are installed into its operating flow system; the maximum set point flow rate has been calculated for that operating flow system, e.g., a large multiple dwelling, which is also input into the VFD pump control processor. The pump is then preferably started at a lower frequency below 60 Hz and gradually increased by the interaction of the P-I-D and the VFD data points until the calculated maximum flow for the system (in which it is operated, e.g., the multiple dwelling apartment building) is reached, based upon the datapoints in the VFD controller database for the pump-motor combination.

Under the usual circumstances of a significant margin of error factor being used when selecting the pump and motor, the pump flow rate will initially be greater (Point B, on FIG. 3) than the required maximum computed flow rate, e.g., Point C, on FIG. 3. If this does result in a flow greater than the desired maximum, the constant flow VFD algorithm will cause the flow to be reduced, by reducing the current oscillation frequency and power input, to achieve the desired calculated maximum flow rate (Point C, on FIG. 3). The pump head produced, and thus the pump speed, are then reduced by reducing the current oscillating frequency, to reach the desired maximum pump flow for the system at reduced power consumption; that value then defines a new quadratic curve, with the zero flow and zero current point, assuming there is no static pressure head to be overcome to initiate flow. If there is such a static pressure head, as shown in FIG. 3, the curve's y-intercept moves up along the y-axis, crossing the y-axis (Point D) at a value above zero, but it will terminate at the same calculated maximum, or design, flow rate.

The curve is dependent upon the particular pump motor combination, as defined by the data points previously entered into the VFD database, in accordance with the affinity laws for centrifugal pumps; a zero-zero point (Point D1, in FIG. 3) assumes that there is no minimum head required to initiate flow, or static pressure head. These two points will be presented on a quadratic curve on the graph of head developed versus flow rate. If a minimum static head is required to be overcome (Point D, in FIG. 3), the minimum point must be raised and reset from the zero-zero point. The static pressure head value and the design flow rate, set the lowest and highest point on the curve. By virtue of the empirical database entered for the centrifugal pump-electric motor combination, the VFD can determine the flow leaving the pump exhaust port from the electrical power being consumed at the known current frequency, without requiring any external sensor. As shown in FIG. 3, the two curves (D-C and D1-C1) gradually converge as the flow increases, so that points C and C1 substantially overlap.

It must be understood that the VFD knows two items about the operation of the pump-motor system: the power input and current frequency. Everything else it learns from the database which correlates those two values with flow rate and pressure head. The speed of the pump rotor is directly proportional to the current frequency. This is a so-called 'sensorless system', which has no sensors external of the pump motor and the controller.

When first started, the VFD is set to its constant flow program, or flow balancing mode, and the maximum design flow rate is entered into that system. The flow system set to maximum demand conditions. When the pump is turned on, the constant flow Program and P-I-D function will vary the electrical frequency speed until it calculates that the pump flow rate is substantially stabilized at the Design Flow value, Point C, and simultaneously calculates the actual system pressure head, based upon the data points in the VFD database. Once that occurs, the program is switched to the Continuous Flow Compensation Mode, electrical frequency ("speed") & pressure head parameter settings are updated to set the actual system operating point and will thereafter meet any changes in demand below the maximum flow. Alternatively, if the system is changed by, e.g., attaching a new branch line to the flow system, thus increasing the maximum flow requirement, the system should be re-programmed by entering the new calculated maximum flow rate, which remains below the raw, nonprogrammed maximum flow rate of the pump-motor combination, e.g., 80 gpm at point B.

Figure 4:
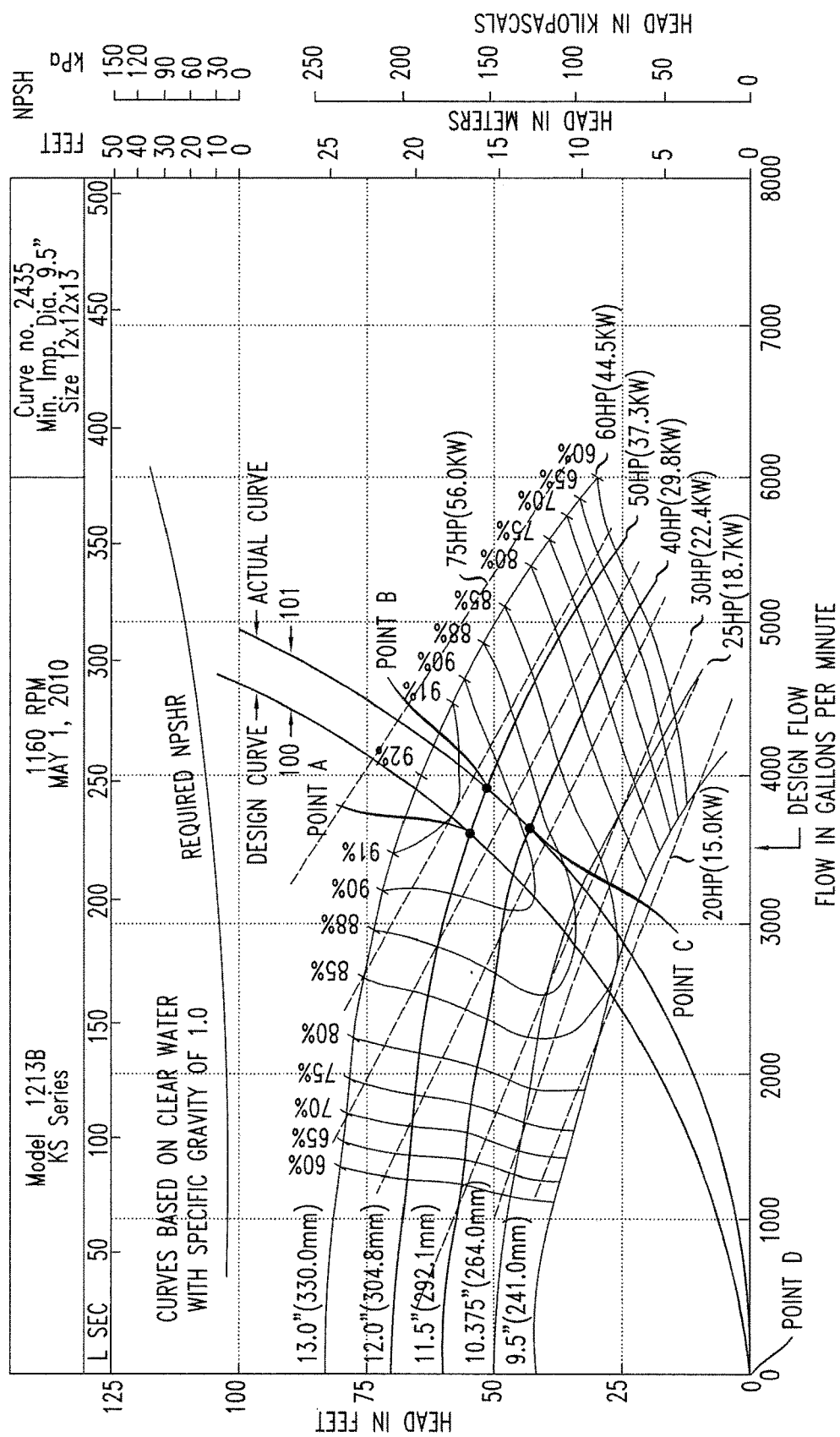
FIG. 4 depicts a graphical chart showing the relationships among pressure head, liquid flow and power input to the pump from the electric motor, at a constant current frequency (e.g. 60 Hz) and a pair of System Resistance Curves having no initial. or static, pressure head to overcome.

The decision trees, or flow charts, of FIGS. 5A-B are intended to set out two examples of the operation of the pump under the control of the P-I-D microprocessor chip in the VFD controller, in accordance with the present invention. As shown, the steps representing the present invention are inserted at the beginning, and once the initial computed maximum flow rate is programmed as a limit into the VFD, the prior art constant flow algorithm takes over, until flow is substantially stabilized at the Design flow rate. At that point, there is a change over to the flow compensation mode algorithm, which will operate the system between the minimum pressure head (which is zero in the case illustrated in FIG. 4) and zero flow, and the computed maximum demand flow of the system, which in the example illustrated by FIG. 4, is about 3600 gpm (at Point C).

However, without the limitation imposed by the computed maximum for the system in which the pump operates, the supplied pump, which was oversized to provide a significant margin of error, would operate at over 3900 gpm (Point B), at max power and at 60 Hz, as shown at point B, in FIG. 3; producing unnecessarily high flow, and thus consuming more power than would be required if operating at the calculated maximum flow demand for the flow system, at point C on FIGS. 3 and 4.

When designing a system, an engineer will usually designate a pump having a capacity greater than the maximum expected requirement for a particular system, such as the water requirements in a multiple residence/office urban skyscraper, in order to be able to compensate for any changes to the system without having to change the pump and motor.

When the power input is set for the flow rate of the maximum data point, as obtained for the general design of the pump, if the head required by the particular system is in fact less than that of the empirical data chart, the controller will automatically reduce the current frequency to the pump motor, so that power matches the actual requirement to achieve the desired maximum flow. The system recognizes that too much flow rate is being supplied because the power input being actually provided is measured to be greater than the database shows should be required to achieve the computed maximum flow rate. The algorithm determines the actual power input required for the correct maximum flow rate and a quadratic operating curve is developed for the pump, so that as the flow rate requirement varies for the system under normal operating conditions, current frequency and power input are automatically regulated to achieve the desired pumping head, i.e., pressure head, and therefore flow rate.

In accordance with this invention, a feedback loop is provided with the software to compare the initial startup flow rate of the pump with the computed maximum. If the initial startup power supplied is too high, the VFD varies the power input and the current oscillation frequency to reduce the pump output flow rate to the desired maximum, as determined from the data base, thus setting the actual system flow curve, that is the System Resistance Curve C-D on FIG. 4, between the zero, or base point, and the maximum flow. The system thereafter operates automatically; as the demand from the overall flow system varies, the VFD automatically varies the current frequency and power input to meet the demand in the most efficient manner. Specifically, the curve c-d sets the combinations of VFD speed and power that will be set by the P-I-D, as the demand varies.

Assuming a situation where the "design speed" (maximum system flow) is not known, the following methodology could be followed. Referring to the example of FIG. 3, as soon as the pump-motor combination is turned on for this small test system in constant speed mode, where the initial current frequency is the normal U.S. frequency of 60 Hz and the power supplied to the motor is at the maximum, by referring to the database, the VFD is notified that the pump is operating at 80 gpm and 45 psi pressure head (see FIG. 3). As the VFD database of the present invention also includes the computed maximum demand requirement for the system in which the pump operates, e.g., 65 gpm (the "Flow set point"), the VFD can calculate the resulting flow rate based upon the frequency and the power that the VFD is applying to the motor, and thus recognizes that the flow rate is 80 gpm, higher than the calculated maximum. Reducing the speed of the pump (by reducing the current frequency), proportionally reduces the flow rate, to the desired maximum flow rate of 65 gpm, and thus also reduces the required power input.

The VFD is programmed to reduce the speed and pressure head at the Design Flow requirement, in accordance with the database and the algorithms, or programs, within the VFD. So, for example, the initial operation is at 60 Hz current oscillation rate, the VFD is programmed to slow down the pump to reduce the maximum flow rate to 65 GPM. To achieve that output, the VFD reduces the current frequency to the motor, which also reduces the power requirement, based upon the data entered from the empirical tests. This sets the maximum design flow output for that system, as previously calculated. The pump-VFD system will then operate in accordance with a P-I-D function included as part of the VFD. By reducing the power consumed by the pump motor, it results in improving the efficiency of the pump.

Figure 6:
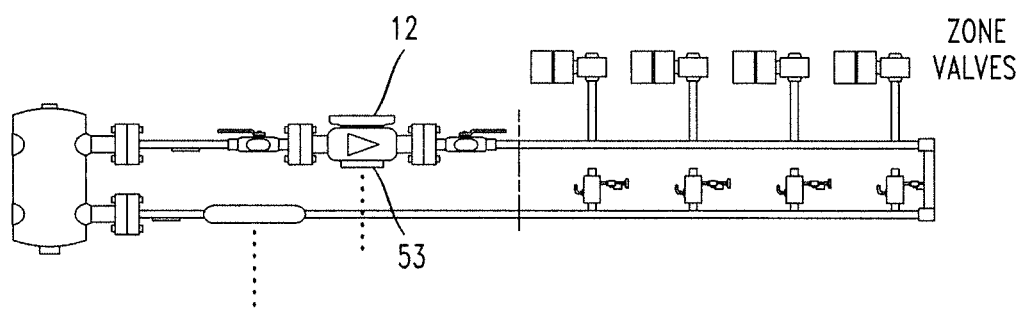
FIG. 6 is a diagrammatic depiction of a heating system controlled by a pump controlled in accordance with the present invention.

Referring to FIG. 4, the curves set out in this chart define a larger, commercial size, pump, and graphically depict the additional values in the database. Two quadratic curves are shown, one example of an ideal operating curve 100, the "Design Curve", based upon the original oversize unit selected by the engineers, and operating at 60 Hz, to achieve the desired flow of approximately 3600 gpm. However, because the actual pump is usually oversized, as part of an engineer's usual margin of error, or the actual system curve is different from the designed system curve due to installation variance, operating at 60 Hz results in a higher flow rate, of about 3950 gpm, Point B, as shown on the "Actual" operating curve 101, which includes the calculated actual maximum flow rate, Point C, required by the system into which it is connected (an example of such a system is shown in FIG. 6). The improved controller of this invention automatically slows the pump down by reducing the frequency of the current powering the pump from 60 Hz to 53 Hz, as shown on FIG. 4. This reduces the flow to the desired calculated maximum system flow, based upon the actual needs of the operating flow system, and saves power, by reducing the electrical power required from about 37.3 kw to about 29.8 kw, i.e., by about 20%.

Once this calculated actual maximum flow is set, as the system requirements change, to operating below the actual system maximum flow, the VFD controller takes over and operates in accordance with its standard Flow Compensation Mode of the prior art, operating along the quadratic curve 101, set in accordance with the data points of the operating parameters in the database of the VFD. It will not go above the maximum 53 Hz set by the computed max flow rate, but, thereafter, will automatically compensate for changed requirements of the overall system in which it operates, between the inputted computed maximum flow/current frequency, and the minimum pressure head and flow, usually zero, zero (Point D).

Every piping system, it is recognized, has a unique fingerprint, which creates fixed relationships; curve 101 on FIG. 4, the "actual curve", which is defined by B, C and D, is called the System Resistance Curve and once you know two actual operating points on the curve, i.e., the maximum flow rate and the minimum flow rate (usually zero), which in this case is B to D. The curve defines the attributes of the system along that System Resistance Curve. You can plot all the others out because there is a fixed relationship recognized in the industry, based upon the resistance set by the overall flow system; the resistance, or pressure requirement, a system offers to a pump varies with the square of the change in flow. Therefore, if flow is doubled, the resistance is quadrupled; if the flow is halved, the resistance is quartered. Thus, the pressure drop in a system varies geometrically, i.e., the square, with the change in flow. It varies with the square of the change in flow and that system resistance curve, as shown in FIGS. 3 and 4, once you define two points, of pressure head and flow, the rest of the curve is defined for that system. That rule generally applies to all systems. It must also be noted, that if new zones are added to the system, the flow can go up to Point B, since the new zones will require increased flow.

For example, a system, such as in a building (FIG. 6), where people may open or close valves (either automatically or manually) which vary the places to which the flow can go, retains the same system resistance curve. A system, with multiple zones that open and close, continues to operate on the same curve with all the zones open, i.e., operating a maximum flow, at point C. But as the zones close down, the required flow starts coming down the curve, because there is less flow demand on the system, and therefore there is a pressure head requirement change to achieve the lower flow.

The graph shown in FIG. 7, shows a quadratic flow curve for a specific pump operating in a specific system, and the dark area depicts the zone of operation of the specific pump in the context of the flow system in which it is incorporated. The region is determined by the prior art VFD, as controlled by the user interface algorithm of the present invention as depicted in FIG. 5A.

Again, the opening and closing of those different zones as the requirements change, does not change that curve. The system still operates along that same curve. The VFD/P-I-D receiving only information regarding VFD speed and power input, check to the previously tabulated database to determine how to vary these values in order to remain on the quadratic curve, B-C-D.

The Flow chart of FIG. 5A sets out a first example of a process for operating the VFD pump-motor combination of this invention, where a human interface is provided, such as a digital readout, to instruct a human operator to modify the operating system from the steady flow rate of the Sensorless Constant Flow program to the Flow Compensation Mode program, in order to change flow rates automatically as system demand changes, such as when one of the system's units goes on or off line, e.g., an apartment resident leaves on vacation and lowers the effect, i.e., a lower temperature in winter or a higher temperature in summer, or shuts off their HVAC system. In accordance with this invention, the VFD database is provided with the empirical laboratory data for the VFD-pump-motor combination, setting out the specific combinations of current frequency, or VFD speed, electrical power input, flow rate and pump pressure head. When the particular VFD-pump-motor combination is selected for a particular real flow system, such as the heating system of an apartment house or office building, the calculated maximum demand flow, or set point to the Design Flow specification, for the particular heating system, is entered as a limitation on the flow rate of the pump when obtained from the building design engineer, along with the design input requirements to support Flow Compensation mode of operation, in order to select the optimum pump-motor combination operating parameters, for efficient operation of the flow system.

The VFD is then programmed to include setups for operating under either a Constant Flow program or a Flow Compensation mode, utilizing the VFD database, and the operation mode parameter preferences based upon the application design specifications, especially the Set Point.

The installed pump is then set to operate at the computed system maximum demand point (for example Point C, on FIGS. 3 and 4), and the VFD is set to the Constant Flow program, which allows the system to reach an operational point of stability, i.e., the point at which the VFD speed (Hz) will remain sufficiently stable at the Design Flow rate set point, Point C on FIG. 4. In so doing, the program replicates the 'actual system curve' of FIG. 4, sets a notice, for example on the display screen 339, and the user then switches the VFD operation mode to the Flow compensation Mode from the Constant Flow mode program, as shown in the flow chart of FIG. 5A. The VFD Constant Flow program calculates the resulting pressure head from the sensorless database, based on actual VFD electrical speed & power measurements during operation and previously entered empirical data on the VFD Database, for the flow rate and pressure head calculated for the Design Flow Rate.

Based upon the calculated Design Flow Rate, and the Database information, the Constant Flow program creates an optimized design curve, which replicates the 'actual system curve' of FIG. 4. The VFD program then switches to the Flow compensation mode, operating under the optimized Design (actual system) Curve and the database parameters.

Under the prior art Flow Compensation Mode operation, if there is a change in demand for the flow system, e.g., if different zone valves are opened or closed off (increase or decrease, respectively) as in FIG. 6, the VFD/P-I-D function interacts with the database and measured power use and current frequency (Hz) to identify and move toward a unique set of four data points that exist on the Flow Compensation Design Curve; associated with current frequency (Hz), power (Horsepower (HP) or Kilowatts (Kw)), flow (gpm), and pressure head (feet). VFD electrical frequency (Hz) will increase or decrease based on the system demand change; ultimately stabilizing at a new point on the Flow Compensation Design Curve, in accordance with system Demand.

The Flow chart of FIG. 5B sets out a second Example of this invention, where the changeover from the steady state Sensorless Constant Flow Mode to the variable Flow Compensation Mode, to meet changes in demand, such as a change in external temperature relative to the desired internal temperature in a building HVAC system, is automatically accomplished by the Automated Pump Balancing Algorithm (added by the present invention), operating with the prior art control system (e.g., the Danfoss system) when the Design flow set point is held stable. As in Method 5A, the VFD database is filled with the necessary parameters showing the relationships of current frequency, power input, pressure head and flow rate for the VFD-Pump-motor system being used. After the empirical data base has been accumulated to support the Flow Compensation mode of operation, the maximum pump output needed for the installed flow system has been calculated, and the optimum VFD-motor-pump model selected, the Flow set point to meet the Design Flow specification is Programmed, and the pump is installed into the flow system and set for the computed maximum system demand, i.e., the limiting Design Flow rate set point, the Automated Pump Balancing Algorithm may be initiated.

At all times during the process, there is two-way digital communication—established either in software only or through a mix of software and hardware interfaces—between the Automated Pump Balancing Algorithm and the prior art VFD software which allows the Automated Pump Balancing Algorithm to set and read VFD parameters, to operate the system in full automatic mode, in accordance with the flow charts of FIGS. 5B and 5B-2. This can be by wired or wireless digital communication, e.g., for example the conventional RS-485 hard-wired protocol to a special terminal on the VDF or by any type of wi fi system now available or as may be developed.

For convenience sake, the following Table sets forth the text of each step set forth in the flow chart of FIG. 5B-2.

| STEP NO. | TEXT OF FIG. 5B-2 |
|---|---|
| 1 | Start ProBalance |
| 2 | Is Pump in auto mode and Running? |
| 3 | End/Report that drive must be in Auto mode. |
| 4 | Capture StartSel (8-53)<br>Stop Pump (Set start select to BUS and remove run flag from control word)<br>Set Active Setup to Variable Flow (Active setup 1) |
| 5 | Did Active Setup change to Variable Flow? |
| 6 | If no, wait 1 second |
| 7 | Store PressureAtNoFlowSpeed (22-87) if not yet stored<br>Store FlowAtDesignPoint (22-89) if not yet stored<br>Store Setpoint1 (20-21) if not yet stored<br>Store Square Linear Curve Approximation if not yet stored<br>Stop Pump (Set start select to BUS and remove run flag from control word)<br>Set Active Setup to Constant Flow (Active setup 3) |
| 8 | Is pump in active setup 3? |
| 9 | If no, wait 1 second |
| 10 | Set Setpoint1 (20-21) to FlowAtDesignPoint<br>Start the pump (set run flag in control word)<br>Set Boolean Balance Indicator to true (useful for programmatically driving valves to desired position) |
| 11 | Alarm Occurs |
| 12 | User duration (default 30 mins) elapsed? |
| 13 | Record Frequency (16-13)<br>Record Head (In this mode sensorless unit 18-50)<br>Record Flow (In this mode feedback unit 16-54) |
| 14 | Set Boolean Balance indicator to false<br>Stop Pump (Set start select to BUS and remove run flag from control word)<br>Set Active Setup to Variable Flow (Active setup 1) |
| 15 | Is pump in Active Setup 1? |
| 16 | If no, wait 1 second |
| 17 | Set Start Select (8-53) back to recorded StartSel |
| 18 | Is Start Select set to StartSel? |
| 19 | If no, wait 1 second |
| 20 | Is recorded Flow within + − 10% of FlowAtDesignPoint and no alarms during balancing? |
| 21 | Set Store to EEPROM flag. |
| 22 | Store to EEPROM flag set? |
| 23 | If no, wait 1 second |
| 24 | Set SpeedAtDesignPoint (22-86) to recorded Frequency.<br>Set Setpoint1 (20-21) to greater of recorded Head or PressureAtNoFlowSpeed |
| 25 | Is SpeedAtDesignPoint set to Frequency and is Setpoint1 set to PressureAtNoFlowSpeed? |
| 26 | If no, wait 1 second |
| 27 | Clear the Store to EEPROM flag. |
| 28 | Is the Store to EEPROM flag cleared? |
| 29 | If no, wait 1 second |
| 30 | Display issue to screen |
| 31 | Report ProBalanceComplete |
| 32 | Stop writing to all bus outputs (set bus outputs to null status) |
| 33 | Done |

The Automated Pump Balancing Algorithm places the VFD into the prior art Flow Compensation Mode and reads Pressure (feet) at No Flow Speed (static head), Flow at Design Point (gpm), Pressure at Design Point (head) and causes the VFD to determine the Square Linear Curve Approximation (%), in accordance with the prior art program. The purpose of this information is two-fold: (1) to obtain current control curve parameters for future comparative display versus the optimized control curve; and (2) To obtain the Flow at Design Point (gpm) reading necessary for balancing the system.

The Automated Pump Balancing Algorithm sets a software flag which may be linked in software (and hardware) for the purpose of driving the system to full demand.

The Automated Pump Balancing Algorithm added in accordance with this invention, and shown diagrammatically in FIG. 5B, starts the prior art Sensorless Constant Flow program and allows the system to run until an adjustable settling time has elapsed. In a properly functioning system, this allows the system sufficient time to reach an operation point of stability, i.e., where the VFD speed (Hz) will remain stable at the Design Flow rate set point.

If at any point in time, the VFD reports an alarm, the remote system connected to the VFD, e.g., a building automation system ("BAS"), is notified by the Automated Pump Balancing Algorithm and the BAS notifies an operator to correct the problem. The process by the VFD is aborted until the alarm situation is removed. Examples of situations that can generate such alarms are set forth in Table 1, below

TABLE 1

| No. | Description |
| --- | --- |
| 1 | 10 Volts low |
| 2 | Live zero error |
| 3 | No motor |
| 4 | Mains phase loss |
| 5 | DC link voltage high |
| 6 | DC link voltage low |
| 7 | DC over voltage |
| 8 | DC under voltage |
| 9 | Inverter overloaded |
| 10 | Motor ETR over temperature |
| 11 | Motor thermistor over temperature |
| 12 | Torque limit |
| 13 | Over Current |
| 14 | Earth fault |
| 15 | Hardware mismatch |
| 16 | Short Circuit |
| 17 | Control word timeout |
| 18 | Start failed |
| 23 | Internal Fan Fault |
| 24 | External Fan Fault |
| 25 | Brake resistor short-circuited |
| 26 | Brake resistor power limit |
| 27 | Brake chopper short-circuited |
| 28 | Brake check |
| 29 | Drive over temperature |
| 30 | Motor phase U missing |
| 31 | Motor phase V missing |
| 32 | Motor phase W missing |
| 33 | Inrush fault |
| 34 | Fieldbus communication fault |
| 35 | Out of frequency range |
| 36 | Mains failure |
| 37 | Phase Imbalance |
| 38 | Internal fault |
| 39 | Heatsink sensor |
| 40 | Overload of Digital Output Terminal 27 |
| 41 | Overload of Digital Output Terminal 29 |
| 42 | Overload of Digital Output On X30/6 |
| 42 | Overload of Digital Output On X30/7 |
| 46 | Pwr. card supply |
| 47 | 24 V supply low |
| 48 | 1.8 V supply low |
| 49 | Speed limit |
| 50 | AMA calibration failed |
| 51 | AMA check Unom and Inom |
| 52 | AMA low Inom |
| 53 | AMA motor too big |
| 54 | AMA motor too small |

TABLE 1-continued

| No. | Description |
| --- | --- |
| 55 | AMA Parameter out of range |
| 56 | AMA interrupted by user |
| 57 | AMA timeout |
| 58 | AMA internal fault |
| 59 | Current limit |
| 60 | External Interlock |
| 62 | Output Frequency at Maximum Limit |
| 64 | Voltage Limit |
| 65 | Control Board Over-temperature |
| 66 | Heat sink Temperature Low |
| 67 | Option Configuration has Changed |
| 68 | Safe Stop |
| 69 | Pwr. Card Temp |
| 70 | Illegal FC configuration |
| 71 | PTC 1 Safe Stop |
| 72 | Dangerous Failure |
| 73 | Safe Stop Auto Restart |
| 76 | Power Unit Setup |
| 79 | Illegal PS config |
| 80 | Drive Initialized to Default Value |
| 91 | Analog input 54 wrong settings |
| 92 | NoFlow |
| 93 | Dry Pump |
| 94 | End of Curve |
| 95 | Broken Belt |
| 96 | Start Delayed |
| 97 | Stop Delayed |
| 98 | Clock Fault |
| 201 | Fire M was Active |
| 202 | Fire M Limits Exceeded |
| 203 | Missing Motor |
| 204 | Locked Rotor |
| 243 | Brake IGBT |
| 244 | Heatsink temp |
| 245 | Heatsink sensor |
| 246 | Pwr. card supply |
| 247 | Pwr. card temp |
| 248 | Illegal PS config |
| 250 | New spare parts |
| 251 | New Type Code |

Again, the VFD Sensorless Constant Flow program calculates the resulting pressure head and flow from the VFD database; based on actual VFD electrical speed & power input measurements made by the VFD.

Before creating an optimized design curve, the Automated Pump Balancing Algorithm verifies system stability by comparing obtained flow with that of the Flow at Design Point. If a difference of, e.g., more than +/−5% occurs, no control curve parameters are modified, the user is notified and the VFD mode is changed back to Flow Compensation Mode.

If the flow is determined by the Automated Pump Balancing Algorithm to be stable, the Flow Compensation parameter settings for Design Pressure Head (feet) and Design Speed (Hz) at the Design Flow Rate (gpm) are modified, creating an optimized design curve which replicates the actual system curve.

The VFD operation switches from Sensorless Constant Flow mode to Flow Compensation mode, utilizing the optimized parameter settings to operate the pump in accordance with the prior art program, e.g., the Danfoss Flow Compensation Mode Program, utilizing the optimized Design Curve & parameter settings. The remaining operation is in accordance with that in the First Example (FIG. 5A) above. The prior art, e.g., Danfoss, flow compensation program, is set so as to operate along a quadratic curve that is determined by the relationships of current frequency, power input, flow and pressure head output from the pump, which the prior art program in the VFD determines, based upon the empirical data input for the pump-motor combination and a mathematical equation included with that prior art system.

In some systems, point D, needs to be increased to above zero, because the overall system has an initial static head that must be overcome before flow can be initiated. The end user can manipulate the shape of that flow compensation, or quadratic resistance curve, above the minimum system. Normally that curve, without any initial static head, will cross 0.0. Once you introduce a static head, which has to be overcome before the pump can produce flow, it is necessary to move the curve upwardly along the y-axis, by the value of the static head. Thus the distance above the 0.0 point is caused by an inherent static flow resistance in the system, e.g., to initiate flow, at least 0.5 Ft of pressure head is required, as shown by Point D in FIG. 3. Again, that is a parameter of the system not of the pump-motor combination. If a system includes a static pressure head, that static pressure head must also be entered into the programs, in order to adjust the quadratic equation as shown by the shift of the beginning of the graphed curve of FIG. 3 upwardly along the y-axis.

In order to redefine the VFD's quadratic control curve to use a new Static Pressure Head value, the VFD speed (current frequency) at static conditions (i.e. no flow) must also be adjusted.

Figure 5C:
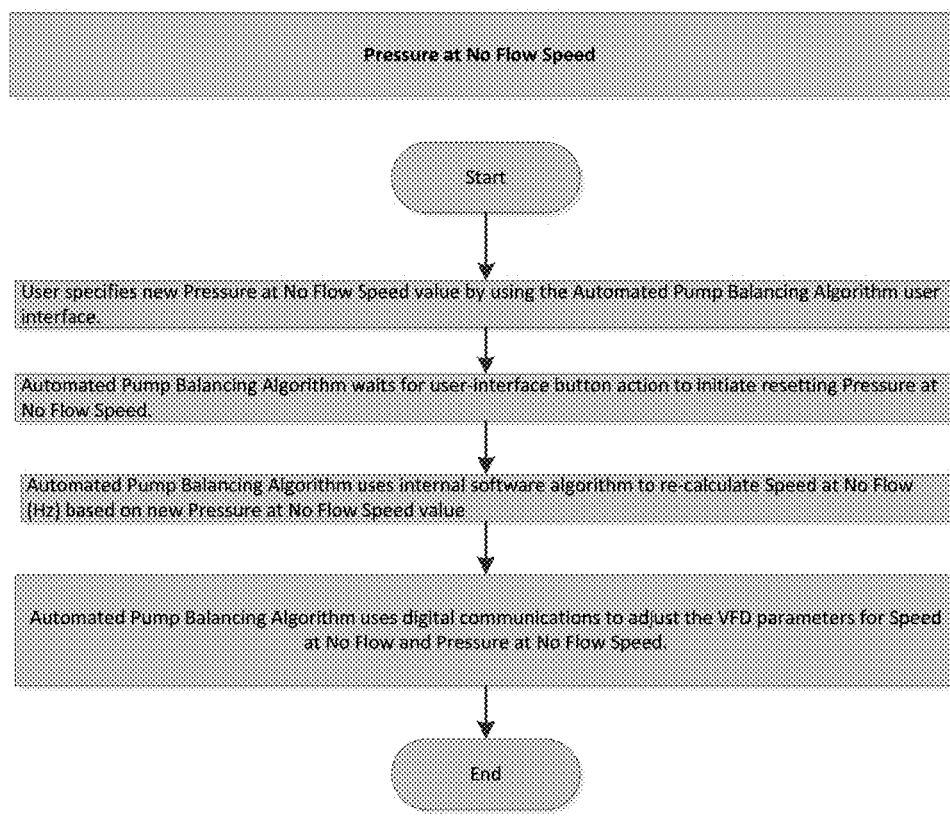
FIG. 5C depicts the flow chart for the algorithm for entering the static head pressure value in terms of the minimum current frequency required to overcome the static head, i.e., where there is "no flow".

The Flow chart of FIG. 5C describes adjustment of the Static Head Pressure in an automated manner, in accordance with the Automated Pump Balancing Algorithm. This algorithm takes as input a new Static Head Pressure value from the end-user and makes all necessary VFD parameter adjustments.

Referring to FIGS. 8A, B, and C, the graphical displays depict the steps to entering a new Static Head value may be entered through the Automated Pump Balancing Algorithm graphical user interface. The Automated Pump Balancing Algorithm user interface provides a button for initiating the process.

Using the new Static Head value, the Automated Pump Balancing Algorithm is able to determine a new Speed (Hz) at No Flow (static) setting appropriate for the particular VFD-motor-pump combination. The pump-specific relationship between Speed (current frequency) at No Flow, and Static Head is empirically determined in a lab setting and is programmed into the Automated Pump Balancing Algorithm.

Finally, the Automated Pump Balancing Algorithm commits the new settings to the VFD drive.

The prior art algorithm in the Flow Compensation Mode is so set to maintain the system on the proper curve, i.e., CD in this example, once the proper maximum is set. The operator of a pump will use a combination of the initial maximum flow rate setting subroutine of this invention and the prior flow compensation mode, for example as commercially offered by Danfoss Drives, of Denmark, in its VLT HVAC Drive, having a Flow Compensation Mode feature, as well as a Sensorless Constant Flow Mode feature.

In accordance with this invention, the Danfoss Flow Compensation software, for example, is modified by inserting a short opening routine, in accordance with the flow charts, or decision trees, of FIGS. 5A, B, which is incorporated into the flow Compensation software as the opening routine, along with additional empirical data into the VFD database, to allow for control of the pump without external sensors for pressure head and flow. The short sub-routine, which starts out utilizing the prior art constant flow mode reset to the Design Point Flow, and then when such flow is steady, changes to the variable flow mode to allow for changes in demand in the overall flow system; this improves the efficient operation of the prior Flow compensation Software, avoiding a complicated and time consuming startup routine each time the system is changed.

In FIGS. 8A, B and C, graphically intermediated adjustments of control curve setpoints can be made either on a touch screen or by a digital interface such as using a mouse button, to drag operating points C and D, in the graphical interface to a new position signifying the correct flow and head values, which are then reset by the software based upon the movement in the graphical interface. If desired, of course, the changes can also be made by entering numerical values as through a keypad or the like. This step is part of the fully automated control system, and can be resident remotely from the VFD drive itself.

The above examples and descriptions are intended to be exemplary only. It is understood that one of ordinary skill in the art will comprehend the full scope of this invention to be set only by the scope of the claims set forth below. It must be understood that the invention is not to be limited to the details of construction and format, or the particular steps, set forth in the above descriptive text and the drawings. The above terminology, except where expressly contradicted by the context of the description, is intended to be expansive rather than limiting. For example when a listing of items is set forth to describe a certain matter, above, the specific items listed are not to be taken as exclusive of others also being included, unless expressly contradicted by the context of the description, for example by use of the term "consisting of". Similarly, when items are described as being in some manner connected, that is to be taken broadly, as being intended to encompass both direct and indirect connections; furthermore, such connections need not be mechanical connections, but depending upon the context is intended to include digital or electrical connections or interfaces.

What is claimed is:

1. An improved method of controlling a specific centrifugal pump driven by an electric motor, the pump being in fluid flow connection with an actual HVAC fluid system, the motor of the specific centrifugal pump being driven by an electric motor being operatively connected to a variable frequency drive ("VFD"), which is operatively connected with a control pad;

the variable frequency drive controlling the frequency of the electric current powering the electric motor and measuring the input of electrical power to the motor; the VFD further comprising:

an input power terminal block, an output power terminal block, a microprocessor having a digital memory holding a digitized database containing an empirically prepared, stored table of associated input power and electrical frequency, compared with liquid flow and pressure head generated by the specific centrifugal pump driven by an electric motor, for the HVAC fluid system; and a proportional-integral-derivative controller ("P-I-D controller") digital control system; and at least one digital input terminal, and at least one digital output terminal;

the method further comprising pre-calculating the actual pressure head (ft) and VFD speed (Hz) to produce the maximum required flow required for the actual HVAC flow system in which the pump is operating and adding that actual pressure head (ft), design flow and VFD speed (Hz) into the digitized database within the memory of the VFD; and placing within the digitized database of the VFD an initial pump starting module that requires that the initial, starting flow rate from the pump be the desired maximum calculated flow rate and the resulting pressure head, for the flow system in which the pump operates, as entered into the database; and further comprising a feedback signal between the P-I-D controller and the VFD database that informs the P-I-D controller to prevent increasing the current frequency and electric power to beyond the values meeting such maximum calculated flow rate.

2. The method of claim 1 wherein the VFD is connected with a building automation system in which is remotely stored an Automated Pump Balancing Algorithm, which algorithm incorporates a timer software module; the method further comprising the VFD communicating with the Automated Pump Balancing Algorithm and its timer to insure the VFD waits a predetermined time until the system reaches flow stability.

3. The method of claim 1 wherein the VFD further includes a fault alarm system, the method further comprising the fault alarm output communicating with a building automated system alarm system, and shutting down the pump.

4. The method of claim 1 wherein the VFD system operates without external sensors.

5. The method of claim 1 wherein the variable frequency drive includes a "flow balancing mode" algorithm, or a Sensorless Constant Flow mode, which seeks to maintain a constant flow rate, based solely on measuring the intrinsic characteristics of the motor, the current frequency and electrical power input.

6. The method of claim 1 wherein the variable frequency drive is programmed to include a software switch, or programmable parameter, for automatically changing to the "flow balancing mode" from the "flow compensation mode" algorithm, when a steady state flow at the calculated maximum is achieved.

7. An improved system for controlling liquid flow through an HVAC fluid flow system subject to varying demand, the system comprising a centrifugal pump-electric motor combination controlled by a VFD/p-i-d combination, having a digital database containing a table of empirically measured data points correlating electrical power input and current oscillating frequency with pump pressure head and flow rate from the pump outlet for the specific centrifugal pump-electric motor combination, the VFD comprising, and being operated by, either a Sensorless Constant Flow mode program or a Variable Flow Compensation mode program, the Variable Flow Compensation mode program including a quadratic equation reflecting liquid flow, and further comprising a display connected to the VFD for displaying the liquid flow as determined by the VFD from the measured current frequency and power input; and the VFD database further comprising the calculated value of the maximum system flow rate required from the specific centrifugal pump-electric motor combination for meeting the maximum demand of the actual HVAC liquid flow system in which the specific centrifugal pump-electric motor combination is installed; and the VFD database further comprising a digital software switch for changing the operation of the VFD between the Sensorless Constant Flow mode program and the Variable Flow Compensation mode program when the flow rate is initially substantially stabilized at the calculated maximum flow rate required from the specific centrifugal pump-electric motor combination for meeting the maximum demand of the actual liquid flow system.

8. In the method of claim 1 wherein the VFD further includes a flow compensation mode.

* * * * *